US011555478B2

(12) United States Patent
Sheng et al.

(10) Patent No.: US 11,555,478 B2
(45) Date of Patent: Jan. 17, 2023

(54) DEEP-SEA MULTI-ENERGY INTEGRATED PLATFORM FOR COMPLEMENTARY POWER GENERATION, PRODUCTION, LIVING AND EXPLORATION

(71) Applicant: GUANGZHOU INSTITUTE OF ENERGY CONVERSION, CHINESE ACADEMY OF SCIENCES, Guangzhou (CN)

(72) Inventors: Songwei Sheng, Guangzhou (CN); Kunlin Wang, Guangzhou (CN); Yin Ye, Guangzhou (CN); Hongjun Lin, Guangzhou (CN); Zhenpeng Wang, Guangzhou (CN); Bing Du, Guangzhou (CN)

(73) Assignee: GUANGZHOU INSTITUTE OF ENERGY CONVERSION, CHINESE ACADEMY OF SCIENCES, Guangzhou (CN)

( * ) Notice: Subject to any disclaimer, the term of this patent is extended or adjusted under 35 U.S.C. 154(b) by 0 days.

(21) Appl. No.: 17/717,170

(22) Filed: Apr. 11, 2022

(65) Prior Publication Data

US 2022/0325697 A1   Oct. 13, 2022

(30) Foreign Application Priority Data

Apr. 9, 2021   (CN) .......................... 202110384083.9

(51) Int. Cl.
  *F03D 9/00*  (2016.01)
  *F03D 9/30*  (2016.01)
  (Continued)

(52) U.S. Cl.
  CPC .............. *F03D 9/008* (2013.01); *B63B 35/44* (2013.01); *B63B 77/10* (2020.01); *F03B 13/10* (2013.01);
  (Continued)

(58) Field of Classification Search
  CPC . F03D 9/008; F03D 9/007; F03D 9/30; F03D 9/45; F03D 13/25; B63B 35/44;
  (Continued)

(56) References Cited

U.S. PATENT DOCUMENTS 6,100,600 A * 8/2000 Pflanz ..................... C02F 1/441
                                                299/9
6,363,718 B1 * 4/2002 Shu ......................... F04B 17/02
                                                60/641.8
(Continued)

FOREIGN PATENT DOCUMENTS

CN      101968026 A      2/2011
CN      202935550 U  *   5/2013
(Continued)

*Primary Examiner* — Mickey H France
(74) *Attorney, Agent, or Firm* — Bayramoglu Law Offices LLC

(57) ABSTRACT

A deep-sea multi-energy integrated platform for complementary power generation, production, living and exploration includes a platform body and a sustainable power supply system, where the platform body includes a column cabin, an upper platform housing, a lower platform housing and a current guide column; the column cabin, the current guide column, the lower platform housing and the upper platform housing are mutually connected to form a triangular platform with a hollow cavity, and a net is disposed in the hollow cavity to form a mariculture zone; the sustainable power supply system includes a wind-driven generator disposed at an end of a top surface of the upper platform housing, a solar panel disposed above a middle portion of the top surface of the upper platform housing, a wave power generation apparatus disposed on the current guide column, and several tidal current power generation apparatuses.

8 Claims, 3 Drawing Sheets

(51) Int. Cl.

| | | |
|---|---|---|
| F03D 9/45 | (2016.01) | |
| F03D 13/25 | (2016.01) | |
| F24S 20/70 | (2018.01) | |
| B63B 77/10 | (2020.01) | |
| B63B 35/44 | (2006.01) | |
| F03B 13/10 | (2006.01) | |
| F03B 13/16 | (2006.01) | |
| F03B 13/18 | (2006.01) | |
| F03B 13/26 | (2006.01) | |

(52) U.S. Cl.
CPC ............ *F03B 13/16* (2013.01); *F03B 13/181* (2013.01); *F03B 13/182* (2013.01); *F03B 13/1815* (2013.01); *F03B 13/262* (2013.01); *F03D 9/007* (2013.01); *F03D 9/30* (2016.05); *F03D 9/45* (2016.05); *F03D 13/25* (2016.05); *F24S 20/70* (2018.05); *B63B 2035/446* (2013.01); *B63B 2035/4426* (2013.01); *B63B 2035/4453* (2013.01); *B63B 2035/4466* (2013.01); *F05B 2240/9112* (2013.01); *F05B 2240/95* (2013.01); *Y02E 10/727* (2013.01)

(58) Field of Classification Search
CPC ............ B63B 77/10; B63B 2035/4426; B63B 2035/4453; B63B 2035/446; B63B 2035/4466; F24S 20/60–69; F24S 20/70; Y02E 10/30–47; Y02E 10/70–727; F03B 13/26–264; F03B 13/18–182; F03B 13/10; F03B 13/16; F03B 13/181; F03B 13/1815; F03B 13/262; F05B 2240/9112; F05B 2240/95

See application file for complete search history.

(56) References Cited

U.S. PATENT DOCUMENTS

| | | | | |
|---|---|---|---|---|
| 2010/0244450 A1* | 9/2010 | Tabe | ............ | F03B 13/262 290/55 |
| 2012/0086206 A1* | 4/2012 | Karimi | ............ | H02S 10/12 290/53 |
| 2012/0144828 A1* | 6/2012 | Lazaris | ............ | H02J 3/46 60/641.1 |
| 2012/0150679 A1* | 6/2012 | Lazaris | ............ | F03G 6/00 705/26.2 |
| 2012/0328437 A1* | 12/2012 | Tunbjer | ............ | F03D 13/25 416/85 |
| 2013/0140823 A1* | 6/2013 | Henry | ............ | F03B 3/04 290/53 |
| 2015/0211477 A1* | 7/2015 | Wright | ............ | F03D 13/25 290/53 |
| 2017/0110883 A1* | 4/2017 | Tabe | ............ | H02J 15/008 |
| 2018/0212432 A1* | 7/2018 | Byrnes | ............ | H02S 40/36 |
| 2018/0354591 A1* | 12/2018 | Burt | ............ | G05B 19/02 |
| 2020/0271086 A1* | 8/2020 | Rohrer | ............ | F03B 13/186 |

FOREIGN PATENT DOCUMENTS

| | | | | | |
|---|---|---|---|---|---|
| CN | 103523181 | A | * | 1/2014 | |
| CN | 103523183 | A | | 1/2014 | |
| CN | 104960636 | A | * | 10/2015 | |
| CN | 105438413 | A | * | 3/2016 | |
| CN | 105863935 | A | * | 8/2016 | |
| CN | 105871307 | A | * | 8/2016 | |
| CN | 106035143 | A | | 10/2016 | |
| CN | 205689354 | U | | 11/2016 | |
| CN | 106460779 | A | | 2/2017 | |
| CN | 206221154 | U | * | 6/2017 | |
| CN | 107044379 | A | * | 8/2017 | |
| CN | 108050016 | A | * | 5/2018 | ............ A01K 61/60 |
| CN | 108216510 | A | * | 6/2018 | |
| CN | 108322137 | A | * | 7/2018 | |
| CN | 109018229 | A | * | 12/2018 | ............ B63B 35/44 |
| CN | 109340024 | A | * | 2/2019 | |
| CN | 110945234 | A | * | 3/2020 | ............ B63B 1/107 |
| CN | 111396253 | A | * | 7/2020 | |
| CN | 211523091 | U | * | 9/2020 | |
| DE | 102012217784 | A1 | * | 6/2014 | ............ B63B 35/44 |
| EP | 3180238 | B1 | * | 6/2020 | ............ B63B 22/04 |
| ES | 2643906 | T3 | * | 11/2017 | ............ B63B 1/107 |
| FR | 3024167 | A1 | * | 1/2016 | ............ B63B 35/44 |
| GB | 2383978 | A | * | 7/2003 | ............ B63B 35/44 |
| GB | 2449620 | A | | 12/2008 | |
| JP | 2003072675 | A | * | 3/2003 | |
| JP | 3169982 | U | * | 8/2011 | |
| KR | 101226561 | B1 | * | 1/2013 | ............ Y02A 40/81 |
| KR | 1507761 | B1 | * | 4/2015 | ............ F03B 13/12 |
| KR | 20150134943 | A | * | 12/2015 | ......... F03B 13/1845 |
| KR | 20200046854 | A | * | 5/2020 | |
| KR | 102169051 | B1 | | 10/2020 | |
| RU | 2483968 | C2 | * | 6/2013 | |
| SE | 1350780 | A1 | * | 12/2014 | |
| WO | WO-2006077999 | A1 | * | 7/2006 | ............ B63B 35/44 |
| WO | WO-2010080043 | A2 | * | 7/2010 | ............ F03B 13/12 |
| WO | WO-2011000207 | A1 | * | 1/2011 | ............ B63B 35/44 |
| WO | WO-2012026883 | A2 | * | 3/2012 | ............ B63B 21/50 |
| WO | WO-2012117135 | A1 | * | 9/2012 | ............ F03B 13/142 |
| WO | WO-2013040871 | A1 | * | 3/2013 | ............ B63B 35/44 |
| WO | WO-2013041231 | A1 | * | 3/2013 | ............... B63B 5/14 |
| WO | WO-2014056049 | A1 | * | 4/2014 | ............ F03B 13/1815 |
| WO | WO-2017094007 | A1 | * | 6/2017 | ............ B63B 35/28 |

\* cited by examiner

DEEP-SEA MULTI-ENERGY INTEGRATED PLATFORM FOR COMPLEMENTARY POWER GENERATION, PRODUCTION, LIVING AND EXPLORATION

CROSS REFERENCE TO THE RELATED APPLICATIONS

This application is based upon and claims priority to Chinese Patent Application No. 202110384083.9, filed on Apr. 9, 2021, the entire contents of which are incorporated herein by reference.

TECHNICAL FIELD

The present disclosure relates to the technical field of offshore floating platforms, and more particularly to a deep-sea multi-energy integrated platform for complementary power generation, production, living and exploration.

BACKGROUND

As the sea is rich in energy sources, activities of humans developing the sea and islands at sea are increased day by day, resulting in gradually outstanding offshore operation cost and energy supply problems. In addition, although the sea covers a vast area, humans cannot work or live at sea without relying on offshore floating bodies. Thus, it is also of great significance to provide a stable production and living platform at sea. The sea contains abundant natural energy and resources, such as wave energy, tidal current energy, wind energy, solar energy, water resources and mineral resources. Therefore, the conversion from natural renewable energy to energy satisfying human production operation demands has great practicability, and also brings a successful step forward in promoting marine exploration and development.

In recent years, with the large-scale development of offshore power generation platforms and the gradually mature development of technologies, the offshore power generation platforms are changed from an extensive form to an intensive form, and various influencing factors greatly restrict economic benefits and sustainable development of a single offshore power generation mode. Further, at present, as mariculture is mainly concentrated in the short shallow sea, spatial resources are limited and the offshore water quality environment is severely polluted day by day, such that the scale of offshore aquaculture is gradually limited or reduced in many coastal regions. At present, it is urgent to expand a new space for offshore aquaculture, and the aquaculture going to the remote deep sea will be a future development trend.

On the other hand, with the development of social economy and improvement of living standards of residents, urban residents have increasingly urgent consumption demands for tourism and leisure, such that offshore tourism is also an important part of deep-sea resource development and has developed rapidly in recent years. The existing tourism development mode has entered the cross-boundary tourism and combines other industries with the tourism industry, which may develop an attractive tourism product, and is more applicable to industrial orientation.

Therefore, since the existing offshore platforms are single in functions and have problems such as insufficient space expansion, low industrial integration, unremarkable characteristic, diversified and differentiated development, the integrated development of offshore power generation, deep-sea aquaculture, marine exploration and leisure tourism will be a general trend, and thus, a mutual combination thereof may reduce the development cost of offshore resources, improve the development intensification of marine resources, and increase the comprehensive benefits of offshore platforms.

SUMMARY

To overcome the shortcomings in the prior art, the present disclosure provides a deep-sea multi-energy integrated platform for complementary power generation, production, living and exploration.

To achieve the above objective, the present disclosure adopts the following technical solutions.

A deep-sea multi-energy integrated platform for complementary power generation, production, living and exploration includes:

a platform body, which includes: three column cabins, a lower platform housing connected to the bottoms of the column cabins, an upper platform housing connected to the tops of the column cabins, and several spaced current guide columns connected between the lower platform housing and the upper platform housing, wherein the column cabins, the current guide columns, the upper platform housing and the lower platform housing are mutually connected to form a triangular platform with a hollow cavity, and a net is disposed in the hollow cavity to form a mariculture zone; and a sustainable power supply system, which includes: a wind-driven generator disposed on an end of a top surface of the upper platform housing to convert wind energy into electric energy and transmit the electric energy to an energy storage unit, a solar panel disposed above a middle portion of the top surface of the upper platform housing to convert solar energy into electric energy and transmit the electric energy to the energy storage unit, a wave power generation apparatus disposed among the current guide columns to convert wave energy into electric energy and transmit the electric energy to the energy storage unit, and several tidal current power generation apparatuses disposed on a top surface of the lower platform housing to convert tidal current energy into electric energy and transmit the electric energy to the energy storage unit.

Further, the wave power generation apparatus includes a wave absorbing float and a closed power generation device compartment that are disposed among the current guide columns; a crankshaft and a wave energy conversion element hinged to the crankshaft are disposed inside the power generation device compartment, and both ends of the crankshaft extend out of the power generation device compartment and are then connected to two supporting arms of the wave absorbing float through hinged shaft supports respectively, such that the wave absorbing float can drive the crankshaft to move synchronously, thereby driving the wave energy conversion element to generate power.

Further, a cross section of a segment of the current guide column close to the lower platform housing is an inverted trapezoid that gradually expands from outside to inside, such that a trapezoidal region that gradually shrinks from outside to inside is formed between every pair of current guide columns, and can enhance the tidal current energy so as to improve the power generation efficiency of the tidal current power generation apparatus.

Further, a foldable stabilizing plate is disposed at an outer side of the lower platform housing.

Further, a beacon mast is disposed on the top surface of the upper platform housing, and devices for navigation, meteorology, communication and observation are mounted on the beacon mast.

Further, a platform deckhouse is disposed between the upper platform housing and the solar panel.

Further, a propeller is disposed at an end of a bottom surface of the lower platform housing.

Further, a crane is further disposed at the end of the top surface of the upper platform housing.

Further, a windlass is further disposed at the end of the top surface of the upper platform housing, and connected to an anchor head through an anchor chain.

Compared to the prior art, the present disclosure has the following beneficial effects.

1. The deep-sea multi-energy integrated platform for complementary power generation, production, living and exploration utilizes clean and non-polluted renewable energy sources such as tidal current energy, wave energy, wind energy and solar energy, conforms to environmental protection and ecology principles, and is also consistent with the future energy supply trend.

2. The deep-sea multi-energy integrated platform for complementary power generation, production, living and exploration integrates four renewable energy sources on one power generation platform, and various energy sources have periodically complementary functions without seasonal adaptability problems, thereby greatly improving the practicability.

3. The deep-sea multi-energy integrated platform for complementary power generation, production, living and exploration is of a semi-submersible structure that may stay on the water surface, sail on the sea surface like a ship, or dock at a wharf, thereby greatly reducing the difficulties and cost of launching, maintenance and migration of the platform.

4. The deep-sea multi-energy integrated platform for complementary power generation, production, living and exploration can carry personnel, devices and materials, such that the energy sources, personnel, materials, and the like may be output to the surroundings, thereby forming an integrated platform integrating research, aquaculture, tourism, entertainment and residence together.

Figure 1:
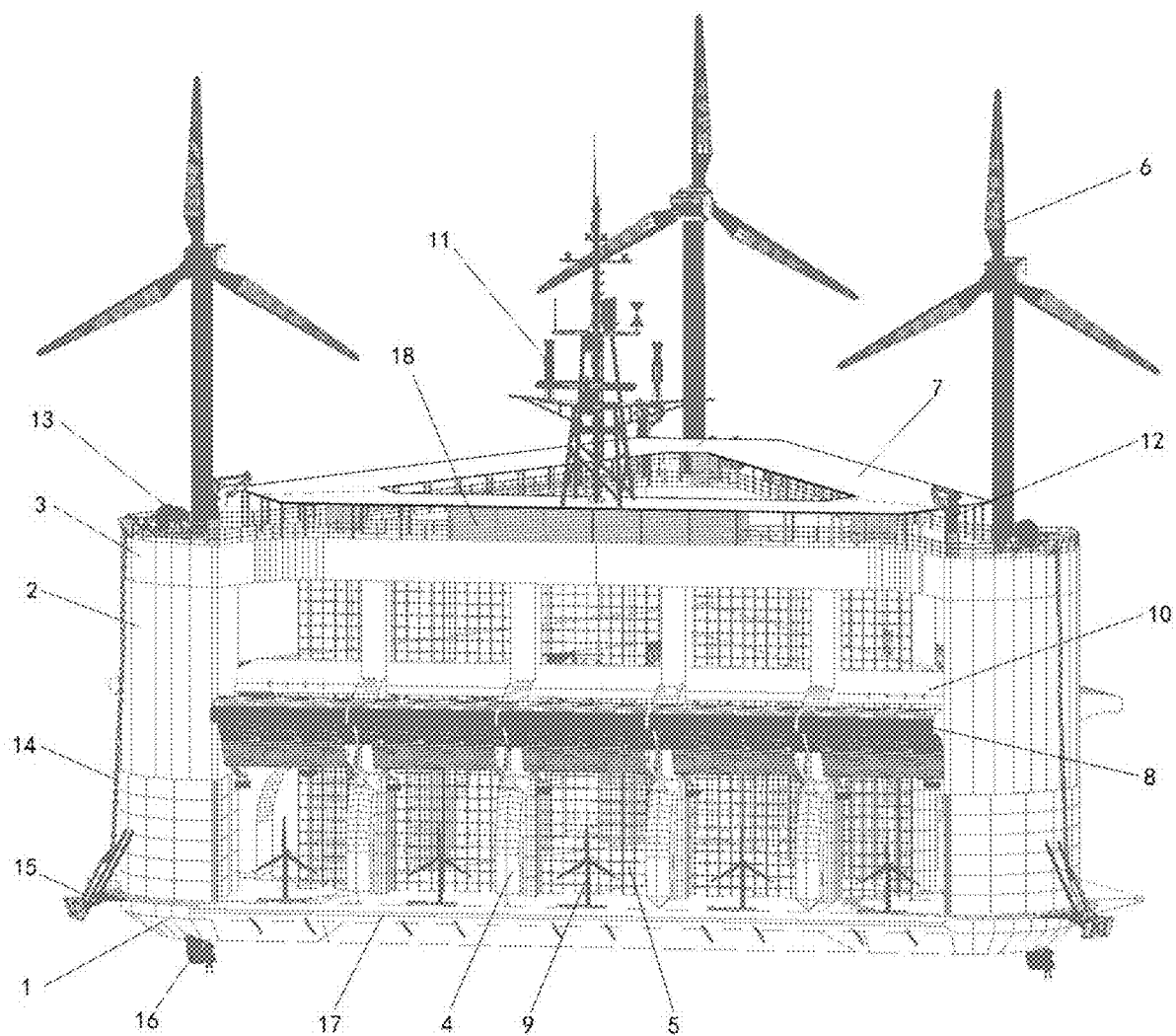
FIG. 1 is a structural implementation diagram of a deep-sea multi-energy integrated platform for complementary power generation, production, living and exploration according to an embodiment of the present disclosure.

Numerals in the drawings are described as follows: 1—lower platform housing; 2—column cabin; 3—upper platform housing; 4—current guide column; 5—net; 6—wind-driven generator; 7—solar panel; 8—wave power generation apparatus; 9—tidal current power generation apparatus; 10—intermediate housing; 11—beacon mast; 12—crane; 13—windlass; 14—anchor chain; 15—anchor head; 16—propeller; 17—foldable stabilizing plate; 18—platform deckhouse; 81—wave absorbing float; 82—power generation device compartment; 83—crank-shaft; 84—wave energy conversion element; 85—supporting arm; 86—sealing seat; 87—coupling; and 88—hinged craft support.

DETAILED DESCRIPTION OF THE EMBODIMENTS

The technical solutions of the present disclosure will be described clearly and completely below in combination with the accompanying drawings in embodiments of the present disclosure. It is obvious that the described embodiments are only a part of embodiments of the present disclosure, not all embodiments of the present disclosure. All other embodiments achieved by those of ordinary skills in the art, based on the embodiments of the present disclosure without creative work, shall fall within the protection scope of the present disclosure.

In the description of the present disclosure, it should be understood that, orientations or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationships as shown in the drawings, for ease of the description of the present disclosure and simplifying the description only, rather than indicating or implying that the indicated device or element must have a particular orientation or be constructed and operated in a particular orientation. Therefore, these terms should not be understood as a limitation to the present disclosure.

Embodiment

As shown in FIG. 1, the deep-sea multi-energy integrated platform for complementary power generation, production, living and exploration in this embodiment mainly includes a platform body and a sustainable power supply system disposed on the platform body.

The platform body is a triangular platform with a hollow cavity, and is mainly composed of a lower platform housing 1, three column cabins 2, an upper platform housing 3 and several current guide columns 4. The lower platform housing 1 and the upper platform housing 3 are both triangular housings each having a triangular hollow cavity. Lower end surfaces of the three column cabins 2 are connected to three ends of a top surface of the lower platform housing 1 respectively, and upper end surfaces of the three column cabins 2 are connected to three ends of a bottom surface of the upper platform housing 3 respectively. The current guide columns 4 are vertically spaced between the lower platform housing 1 and the upper platform housing 3. Thus, the structure of the platform is strengthened, and a side span of the platform may also be divided.

A net 5 is disposed in the hollow cavity inside the platform body to form a mariculture zone. A propeller 16 is mounted at three ends of the bottom surface of the lower platform housing 1 respectively to realize dynamic positioning and short-distance sailing. A foldable stabilizing plate 17 is disposed on an outer side surface of the lower platform housing 1. The foldable stabilizing plate 17 may be folded upward in a towing state, or unfolded horizontally in a working state to increase the area of the lower platform housing 1, increase the stability of the entire platform in waves, and improve the wind wave resistance capability of the platform, so as to adapt to extreme weather such as typhoon. A top surface of the upper platform housing 3 forms a working deck, and a beacon mast 11 is mounted in the middle of the working deck to mount devices for navigation, meteorology, communication, observation, and the like. A crane 12 and a windlass 13 are mounted at three corners of the working deck respectively. The crane 12 is used for fish collection at sea or goods lifting. The windlass 13 is connected to an anchor head 15 through an anchor chain 14 to drop or house an anchor. During anchor dropping, the anchor chain 14 is dropped into the sea by the windlass 13; and during anchor housing, the anchor chain 14 is rolled up by the windlass 13, and the anchor head 15 is also taken back along with the anchor chain 14. A ballast tank is disposed at the bottom of the column cabin 2 or on the lower platform housing 1, such that the platform may float or sink by adjusting the ballast water volume of the ballast tank. Air is discharged from the tank and water is charged into the tank, such that the platform submerges and reaches a designed working waterline; and the platform has a large draft in this state, and may provide a large amount of mariculture water. Air is charged into the tank and water is discharged from the tank, such that the platform floats upward and rises until the top surface of the lower platform housing 1 reaches a certain height above the water surface, thereby facilitating towage, fish collection and overhauling.

The sustainable power supply system is an offshore sustainable power supply system composed of wind energy, solar energy, wave energy, tidal current energy and storage energy, and includes wind-driven generators 6, a solar panel 7, a wave power generation apparatus 8 and a tidal current power generation apparatus 9. Three wind-driven generators 6 are disposed and mounted at three ends of the upper platform housing 3 respectively to convert wind energy into electric energy. The solar panel 7 is laid above the upper platform housing 3 through supporting columns except for three corners of the upper platform housing 3 and configured to convert solar energy into electric energy. For example, if the solar panel 7 is replaced with a solar heating panel, the solar energy may be converted into heat energy. The working deck of the upper platform housing 3 may be additionally equipped with a device, a building, and the like according to requirements, e.g., the platform deckhouse 18 in the drawing, or the working deck may even be inhabited and expanded into a production and living platform. The position of the wave power generation apparatus 8 is designed in the vicinity of the working waterline of the platform, and a wave power generation apparatus 8 is mounted between every pair of current guide columns 4 to convert wave energy into electric energy. The tidal current power generation apparatus 9 is disposed on the top surface of the lower platform housing 3, and a tidal current power generation apparatus 9 is mounted between every pair of current guide columns 4 to convert tidal current energy into electric energy. Preferably, to improve the power generation efficiency of the tidal current power generation apparatus 9, a cross section of a segment of the current guide column 2 close to the lower platform housing 1 is an inverted trapezoid that gradually expands from outside to inside, such that a trapezoidal region that gradually shrinks from outside to inside is formed between every pair of current guide columns 2, and the trapezoidal region may enhance the tidal current energy in this region due to a current gathering effect, thereby improving the power generation efficiency of the tidal current power generation apparatus 9.

The electric energy emitted by four different power generation apparatuses of the platform according to the present disclosure is converted into direct current, and then stored in an energy storage unit in a unified way. A storage battery may be selected as the energy storage unit. The stored electric energy may be output through a watertight cable interface to realize the uninterrupted supply and automatic production of production power under extreme conditions.

Figure 2:
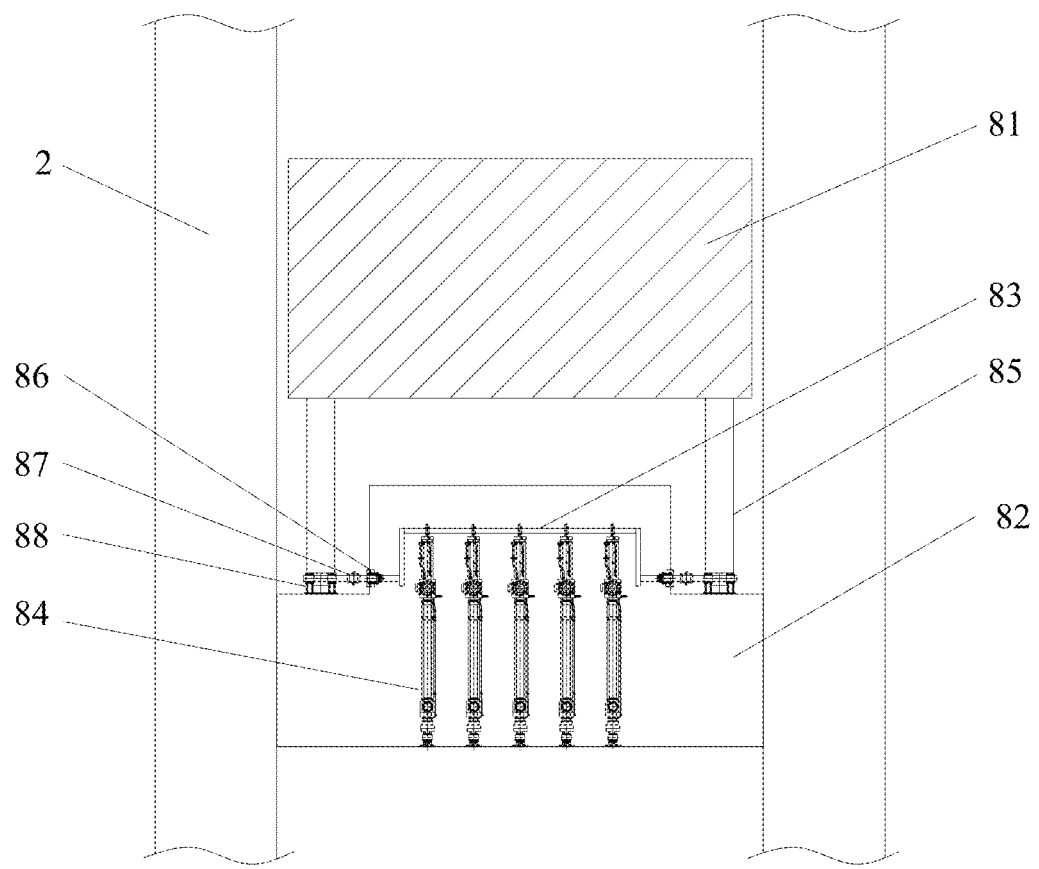
FIG. 2 is a structural schematic diagram of a wave power generation apparatus according to an embodiment of the present disclosure.
Figure 3:
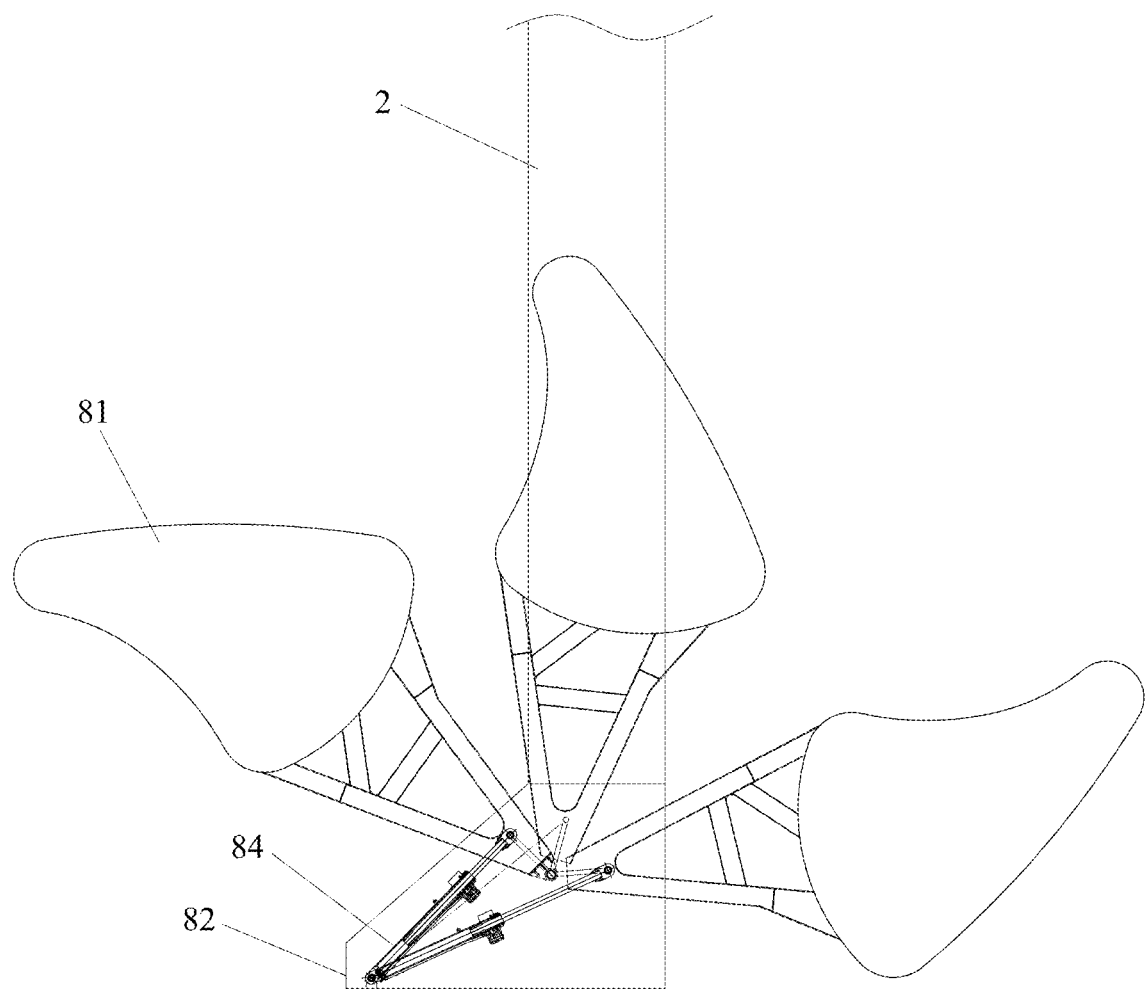
FIG. 3 is a schematic motion diagram of a wave power generation apparatus according to an embodiment of the present disclosure.

As shown in FIG. 2 and FIG. 3, the wave power generation apparatus 8 includes a wave absorbing float 81 and a power generation device compartment 82 that are disposed among the current guide columns 2. The wave absorbing float 81 is the existing eagle's head type wave absorbing float, and the power generation device compartment 82 is mounted below the wave absorbing float 81, disposed in a sealed manner, and protrudes upward from the top surface of the middle portion of the wave absorbing float 81. A crankshaft 83 and a wave energy conversion element 84 are disposed inside the power generation device compartment 82. A lower end of the wave energy conversion element 84 is hinged to a bottom surface of the power generation device compartment 82, and an upper end of the wave energy conversion element 84 is hinged to the crankshaft 83. Each of both ends of the crankshaft 83 extends out of the power generation device compartment 82, and is then connected to a rotary shaft of a hinged shaft support 88 mounted on a top surface of the power generation device compartment 82 through a coupling 87 respectively, and the crankshaft 83 is connected to the power generation device compartment 82 through a sealing seat 86 in a dynamic sealing manner. Each of both sides of the wave absorbing float 81 is fixedly connected to the rotary shaft of the hinged shaft support 88 through a supporting arm 85 respectively. In this way, when swinging around the hinged shaft support 88, the wave absorbing float 81 drives the rotary shaft of the hinged shaft support 88 to swing synchronously, and the rotary shaft drives the crankshaft 83 to swing synchronously through the coupling 87, thereby driving the wave energy conversion element 84 to generate power. The wave energy conversion element 84 may be an existing conversion element that moves linearly, such as a hydraulic cylinder or a linear motor.

For the wave power generation apparatus 8 of the present disclosure, the wave energy conversion element 84 is disposed in the closed power generation device compartment 82 to avoid direct connection to the external wave absorbing float 81. On the one hand, the erosion and damage caused by external factors such as seawater may be avoided, and the service life of the device may be prolonged. On the other hand, the wave energy conversion element 84 does not restrict the movement of the wave absorbing float 81, such that a swing amplitude of the wave absorbing float 81 may be substantially improved. As shown in FIG. 3, since the wave energy may be fully utilized, the power generation efficiency of the wave power generation apparatus 8 is significantly improved. Since the mariculture zone is located inside the platform of the present disclosure, an intermediate housing 10 is disposed above the wave absorbing float 81 to prevent the inward swinging of the wave absorbing float 81 from colliding with the net 5.

In summary, in the deep-sea multi-energy integrated platform for complementary power generation, production, living and exploration of the present disclosure, the hollow cavity is disposed in the platform body to form the mariculture region, and mariculture net cages may be disposed for aquaculture. Various renewable power generation apparatuses such as wind power generation, photovoltaic power generation and sea power generation are fixed on the platform body, and clean energy sources such as wave energy, tidal current energy, solar energy and wind energy are taken as production power sources to construct a microgrid in a production sea region, thereby realizing the uninterrupted supply and automatic production of production power under extreme conditions. The platform body may also be disposed on the seabed, underwater or water surface to carry sky exploration devices and instruments and construct experimental cabins for hydrology, meteorology, and the like, and thus satisfies a condition for long-term scientific research in the open sea. Leisure and entertainment facilities as well as a sea paradise system may also be built on the platform body to satisfy deep-sea tourism demands of people, thereby forming an integrated platform integrating research, aquaculture, pleasure, entertainment and residence together.

The aforementioned embodiments are only intended to illustrate the technical concept and features of the present disclosure, and the objective thereof is to enable those of ordinary skills in the art to understand the content of the present disclosure and implement the content of the present disclosure accordingly rather than limit the protection scope of the present disclosure. All equivalent changes or modifications made according to the spirit of the content of the present disclosure should be covered within the protection scope of the present disclosure.

What is claimed is:

1. A deep-sea multi-energy integrated platform for complementary power generation, production, living and exploration, comprising:
    a platform body, comprising:
        three column cabins,
        a lower platform housing connected to the bottoms of the column cabins, an upper platform housing connected to the tops of the column cabins, and
        several spaced current guide columns connected between the lower platform housing and the upper platform housing,
        wherein the column cabins, the current guide columns, the upper platform housing and the lower platform housing are mutually connected to form a triangular platform with a hollow cavity, and a net is disposed in the hollow cavity to form a mariculture zone; and
    a sustainable power supply system, comprising:
        a wind-driven generator disposed at an end of a top surface of the upper platform housing to convert wind energy into electric energy and transmit the electric energy to an energy storage unit,
        a solar panel disposed above a middle portion of the top surface of the upper platform housing to convert solar energy into the electric energy and transmit the electric energy to the energy storage unit,
        a wave power generation apparatus disposed between the current guide columns to convert wave energy into the electric energy and transmit the electric energy to the energy storage unit, and
        several tidal current power generation apparatuses disposed on a top surface of the lower platform housing to convert tidal current energy into the electric energy and transmit the electric energy to the energy storage unit;
        wherein the wave power generation apparatus comprises a wave absorbing float and a closed power generation device compartment that are disposed among the current guide columns; the power generation device compartment is disposed below the wave absorbing float; a crankshaft and a wave energy conversion element are disposed inside the power generation device compartment, the wave energy conversion element comprises a lower end hinged to a bottom surface of the power generation device compartment and an upper end hinged to the crankshaft, wherein two ends of the crankshaft extend out of the power generation device compartment and are then connected to two supporting arms of the wave absorbing float through hinged shaft supports respectively, such that the wave absorbing float is capable of driving the crankshaft to move synchronously, thereby driving the wave energy conversion element to generate power.

2. The deep-sea multi-energy integrated platform for the complementary power generation, the production, the living and the exploration according to claim 1, wherein a cross section of a segment of the current guide column close to the lower platform housing is an inverted trapezoid that gradually expands from an outside to an inside, such that a trapezoidal region that gradually shrinks from the outside to the inside is formed between every pair of the current guide columns and the trapezoidal region is capable of enhancing the tidal current energy so as to improve a power generation efficiency of the several tidal current power generation apparatuses.

3. The deep-sea multi-energy integrated platform for the complementary power generation, the production, the living and the exploration according to claim 1, wherein a foldable stabilizing plate is disposed at an outer side of the lower platform housing.

4. The deep-sea multi-energy integrated platform for the complementary power generation, the production, the living and the exploration according to claim 1, wherein a beacon mast is disposed on the top surface of the upper platform housing, and devices for navigation, meteorology, communication and observation are mounted on the beacon mast.

5. The deep-sea multi-energy integrated platform for the complementary power generation, the production, the living and the exploration according to claim 1, wherein a platform deckhouse is disposed between the upper platform housing and the solar panel.

6. The deep-sea multi-energy integrated platform for the complementary power generation, the production, the living and the exploration according to claim 1, wherein a propeller is disposed at an end of a bottom surface of the lower platform housing.

7. The deep-sea multi-energy integrated platform for the complementary power generation, the production, the living and the exploration according to claim 1, wherein a crane is further disposed at the end of the top surface of the upper platform housing.

8. The deep-sea multi-energy integrated platform for the complementary power generation, the production, the living and the exploration according to claim 1, wherein a windlass is further disposed at the end of the top surface of the upper platform housing and connected to an anchor head through an anchor chain.

* * * * *